July 6, 1971      G. W. NEFF ET AL      3,591,482

SILVER-SILVER CHLORIDE ELECTRODE AND METHOD OF MAKING SAME

Filed April 23, 1969

INVENTORS
GORDON W. NEFF
CARLOS J. SAMBUCETTI
JOHN E. TOMKO

BY

*John A. Jordan*
ATTORNEY 3,591,482
SILVER-SILVER CHLORIDE ELECTRODE AND
METHOD OF MAKING SAME
Gordon W. Neff, Mahopac, and Carlos J. Sambucetti, Mohegan Lake, N.Y., and John E. Tomko, Shelburne, Vt., assignors to International Business Machines Corporation, Armonk, N.Y.
Filed Apr. 23, 1969, Ser. No. 818,608
Int. Cl. G01n 27/30
U.S. Cl. 204—195
16 Claims

ABSTRACT OF THE DISCLOSURE

The silver chloride layer of a silver-silver chloride electrode is coated with a thin protective layer of methacrylate. The layer of methacrylate acts to prevent corrosion of the silver chloride layer and yet allows same to retain its ion sensitivity.

Background of the invention

The present invention relates to ion sensitive devices and more particularly to chloride ion sensitive devices such as the silver-silver chloride electrode.

The applicability of the silver-silver chloride electrode to systems for sensing or measuring ion activity is well known and well established as is evidenced by the many references thereto in the prior art. Basically the silver-silver chloride electrode consists of a metallic silver surface coated with a layer or film of silver chloride. When the layer of silver chloride is contacted with a solution containing chloride ions, a surface potential is produced on the silver chloride layer, the magnitude of which is proportional to the chloride ion activity. Such a relationship is expressed by a form of the well known Nernst equation $E = E_0 + S \log a$, where $E_0$ represents a constant voltage factor, S represents the sensitivity factor of the layer and $a$ represents the chloride ion activity under measurement.

One of the major difficulties with the silver-silver chloride electrode is its high susceptibility to "aging." In particular the electrode tends to quickly deteriorate. This deterioration is mainly in the form of spontaneous decomposition of the silver chloride layer or film to metallic silver, and in some cases to silver oxide. This condition is manifested by the blackening of what is, initially, a pinkish colored electrode.

It appears clear that this action is due, in part at least, to photochemical decomposition of the film. This is borne out by the fact that films of silver chloride "age" much more slowly in a dark environment. However, it is also clear that other conditions, such as the nature of certain species in the solution under test, may also promote deterioration in general and photochemical decomposition in particular.

It is clear that decomposition of an electrode sensing surface changes its properties and renders the electrode unreliable, if not unusable. The problem is particularly acute where the electrode sensing surface is susceptible to rapid decomposition. Thus, it is evident that the silver-silver chloride electrode has had serious limitations imposed upon its use.

One such limitation on use is in its application to continuous and automatic monitoring operations. One approach to the "aging" problem encountered in automatic monitoring applications is disclosed in the application Ser. No. 565,658 of H. Dahms filed July 15, 1966, now U.S. Pat. No. 3,458,421, and assigned to the assignee of the present invention. There an arrangement is shown for automatically periodically replating to regenerate the silver chloride surface. The difficulty with this approach is the electrode essentially uses a new and different surface each time the plating action occurs and therefore the electrode must be re-standardized after each regeneration cycle. In addition, it is clear that such an arrangement is undesirable from the standpoint of requiring electronic apparatus dedicated to regenerating the electrode.

In accordance with the present invention the "aging" problem inherent in the use of the silver-silver chloride electrode is overcome simply, effectively and economically by coating the silver chloride layer with a thin, smooth, layer of methacrylate. Such a layer over the silver chloride surface acts to retard "aging" and yet does not have any detrimental effect upon either the sensitivity or time response of the electrode, in normal operations. Electrodes made in accordance with the present invention were found to be free from the effects of aging after many months while unprotected electrodes show the effect of aging within a few days.

It is therefore an object of this invention to provide an improved ion sensitive electrode.

It is a further object of this invention to provide an improved chloride ion sensitive electrode.

It is yet a further object of this invention to provide an improved silver-silver chloride electrode.

It is still a further object of this invention to provide an improved silver-silver chloride ion sensitive electrode by employing a novel arrangement to inhibit "aging" of the electrode.

It is yet another object of this invention to provide a simple, effective and inexpensive solution to the "aging" problem of the silver-silver chloride electrode.

The foregoing and other objects, features and advantages of the invention will be apparent from the following more particular description of preferred embodiments of the invention, as illustrated in the accompanying drawings.

DETAILED DESCRIPTION OF THE DRAWINGS

Figure 1:
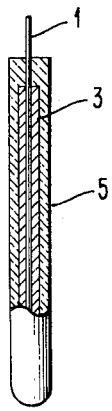
FIG. 1 shows one embodiment of the novel features of the present invention in the form of a probe type electrode configuration.

In the needle type or elongated probe arrangement of FIG. 1 silver wire 1 is shown with an electroplated silver chloride layer 3 in accordance with the general techniques for fabricating a silver-silver chloride electrode. An electrode so fashioned is highly susceptible to decomposition and deterioration whether immersed in a fluid under test or lying idle.

In accordance with the novel aspects of the present invention this high susceptibility to deteriorate is overcome by coating the silver chloride layer 3 with a thin layer of methyl methacrylate 5, approximately 25 microns thick. Such a thickness is sufficient to completely coat the silver chloride surface yet not sufficient to significantly affect the impedance of the probe. Such uncritical thickness may be conveniently obtained by dipping the silver chloride coated silver wire into molten methacrylate.

The unique and unusual aspects of an electrode so configured lies in the fact that not only does the methacrylate protect the silver chloride layer from "aging," but it also allows the silver chloride surface to retain its chloride ion sensitivity. Although there is some reduction in the chloride ion sensitivity factor S, this reduction has no significant effect upon normal measurements of chloride activity as testing in solutions of chloride, in the presence of other ion species, showed no more interference than with a conventional uncoated silver chloride layer.

Retention of ion sensitivity through the layer of methacrylate is clearly contrary to what might be expected since the electrical properties of methacrylate are such that it is classified primarily as an insulator.

The fact that chloride ions in the sample under test selectively affect the potential of the silver chloride layer, in accordance with the findings of the present invention, may be attributed to an ion diffusion process across or adsorption by the methacrylate layer, with an attendant charge transfer mechanism also involved.

Protection and stabilization of the silver chloride layer, as taught by the present invention, appears to result, in part at least, from the fact that the glasslike layer of methacrylate acts as a filter to either block or significantly decrease, the effect of certain types of light radiation on the silver chloride layer thereby inhibiting photodecomposition. Likewise, the inert layer of methacrylate may also inhibit attack on the silver-silver chloride by oxygen and other species that may be present in solution or the environment in which the electrode is placed. It is evident, however, that there may be other underlying reasons for the effectiveness of the methacrylate layer.

Although reference thus far has been made to methyl methacrylate, it is clear that other forms of methacrylate, as for example ethyl or butyl methacrylate may likewise be used, although methyl methacrylate is preferred.

The following table shows one set of test results obtained using a probe type silver-silver chloride electrode coated with a layer of methyl methacrylate and also compares these results with an unprotected electrode.

termination may also be made as to the effect of other ions on the methacrylate-coated electrode. Consistency in the values of the measured results indicates that there is no interference on the part of other ions and that the methacrylate-coated probe responds selectively to measured chloride ions. As can be seen from the table, the methacrylate-coated electrode has a good sensitivity factor and the potential variation between runs is small, thus indicating good reproducibility.

The Versatol A and Versatol A-alternate solutions listed in the table are unknown solutions. These are artificial serum standards containing many constituents other than chloride and these two solutions represent the lower and upper limits, respectively, of the physiological range of value for chloride in serum. By taking an average of the two sensitivity factors S, calculated from the standard solutions for each of the electrodes, and taking the potential readings obtained for each of the electrodes in each solution the activity $a$ for each electrode in each solution was computed. A comparison of these chloride activity measurements for each electrode in the versatol solutions demonstrate the closeness in results, i.e 70.02 as compared to 70.2 and 84.0 as compared to 82.4 meq. Cl/l. Thus, it is clear from the table that the electrode made in accordance with the present invention is both chloride ion selective and chloride ion sensitive and compares very closely in measurement results to the conventional silver-silver chloride electrode.

Figure 2A:
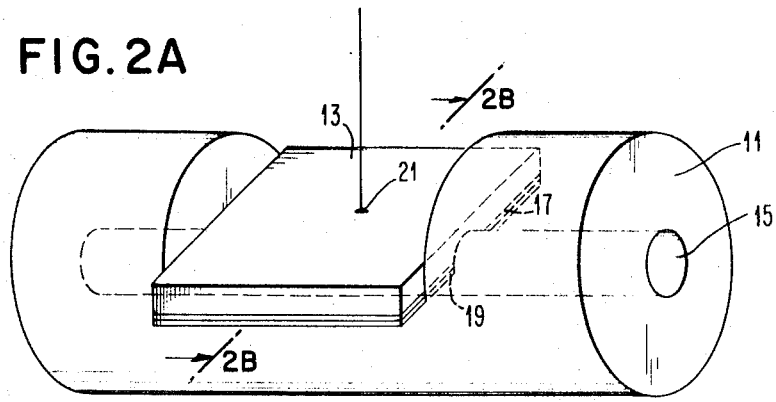
FIG. 2A shows an alternative embodiment of the novel features of the present invention in the form of a flow-through type electrode configuration.
Figure 2B:
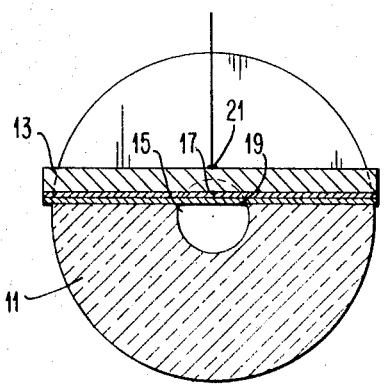
FIG. 2B shows a cross-sectional view of the arrangement of FIG. 2A, taken along line 2B.

With reference to FIGS. 2A and 2B, there is shown a flow-through type electrode configuration. A piece of thick-walled plastic or glass tubing 11 is cut to accommodate silver plate 13 so the latter communicates with flow-through channel 15, as shown in FIG. 2A. The side of plate 13 which communicates with channel 15 also in- TABLE.—COMPARISON BETWEEN METHACRYLATE COATED SILVER-SILVER CHLORIDE ELECTRODE AND A CONVENTIONAL SILVER-SILVER CHLORIDE ELECTRODE

| | Methacrylate coated electrode | | | Conventional electrode | | |
|---|---|---|---|---|---|---|
| Solution type | Potential $E$ (mv.) | Sensitivity $S=\dfrac{E_2-E_1}{\log a_2/a_1}$ | Activity $a$ meq. Cl/l. | Potential (mv.) | Sensitivity $S=\dfrac{E_2-E_1}{\log a_2/a_1}$ | Activity $a$ meq. Cl/l. |
| Standard solution #1: | | | | | | |
| Run A | −46.2 | 31.0 } | 86 { | −4.87 | 52.8 } | 86 |
| Run B | −46.0 | 29.0 } |  | −4.46 | 52.4 } |  |
| Standard solution #2: | | | | | | |
| Run A | −43.1 | 31.0 } | 111 { | +0.41 | 52.8 } | 111 |
| Run B | −43.1 | 29.0 } |  | +0.78 | 52.4 } |  |
| Versatol A: | | | | | | |
| Run A | −45.0 | ¹ 30.0 } | 70.02 { | −3.08 | ¹ 52.6 } | 70,2 |
| Run B | −44.9 | ¹ 30.0 } |  | −3.10 | ¹ 52.6 } |  |
| Versatol A alternate: | | | | | | |
| Run A | −42.7 | ¹ 30.0 } | 84.0 { | −1.77 | ¹ 52.6 } | 82,4 |
| Run B | −42.6 | ¹ 30.0 } |  | −1.77 | ¹ 52.6 } |  |

¹ Average.

The standard solutions in the table are mixtures containing a known concentration of chloride ions, as well as known concentrations of other ions. Two complete test runs for each of the standard solutions were made, the runs being designated A and B in the table. By employing known ion concentrations in standard solution #1 which differ from the known ion concentrations in standard solution #2, a determination of sensitivity S, for both the methacrylate-coated electrode and the conventional electrode was first allowed to be made. This was accomplished by computing an average of the voltage readings obtained from the Runs A and B for each of the respective standard solutions and employing the same in the calculation of S, in accordance with the formula shown in the sensitivity column. Thus, $E_1$ in the formula corresponds to average voltage value of the runs of standard solution #1, and $E_2$ corresponds to average voltage value of the runs of standard solution #2. With the sensitivity factor for each of the electrodes computed, using standard solutions of known ion concentration, then, the ion concentration of unknown solutions may be measured by each of the electrodes and a comparison of these results made.

By using different concentrations of the ions other than chloride ions in the two standard solutions, a decludes a layer of silver chloride 17 and a layer of methacrylate 19, as shown in the cross-sectional view of FIG. 2B. As the fluid sample flows through channel 15 it comes into contact with the layer of methacrylate 19 and the chloride ions embodied in the fluid effect a change in potential on the silver chloride layer 17. Ohmic contact 21 to silver plate 13 allows this potential to be measured.

While the invention has been particularly shown and described with reference to the preferred embodiments thereof, it will be understood by those skilled in the art that the foregoing and other changes in form and details may be made therein without departing from the spirit and scope of the invention.

What is claimed is:
1. An ion sensitive device comprising:
   a metallic silver surface;
   a layer of silver chloride on said silver surface; and
   a protective layer of methacrylate coating said silver chloride surface acting to inhibit corrosion of said silver chloride while at the same time allowing said layer of silver chloride to be ion sensitive.
2. The device as set forth in claim 1 wherein said metallic silver surface, said layer of silver chloride and said layer of methacrylate are configured to form an elongated electrode.

3. The device as set forth in claim 1 configured to the form of a flow-through electrode so that at least a portion of the inner fluid carrying wall comprises said layer of methacrylate arranged between said fluid and said layer of silver chloride so that said layer of silver chloride responds to ions in said fluid flowing through said electrode and is, at the same time, protected from corrosion.

4. The device as set forth in claim 1 wherein said ions are chloride ions.

5. The device as set forth in claim 1 wherein said methacrylate is methyl methacrylate.

6. The device as set forth in claim 1 wherein said methacrylate is butyl methacrylate.

7. The device as set forth in claim 1 wherein said methacrylate is ethyl methacrylate.

8. A chloride ion sensitive electrode including a body of metallic silver supporting a layer of silver chloride the improvement comprising: a thin film of methacrylate coating said layer of silver chloride whereby said film of methacrylate acts to protect said silver chloride from corrosion yet allows the silver chloride layer to retain its chloride ion sensitivity.

9. The device as set forth in claim 8 wherein said methacrylate is methyl methacrylate.

10. The device as set forth in claim 8 wherein said methacrylate is butyl methacrylate.

11. The device as set forth in claim 8 wherein said methacrylate is ethyl methacrylate.

12. A method of protecting a silver-silver chloride ion sensitive electrode comprising: coating the silver chloride surface with a layer of methacrylate so as to protect said electrode from deterioration without affecting ion sensitivity.

13. The method as set forth in claim 12 wherein said methacrylate is methyl methacrylate.

14. The method as set forth in claim 12 wherein said methacrylate is butyl methacrylate.

15. The method as set forth in claim 12 wherein said methacrylate is ethyl methacrylate.

16. A chloride ion sensitive electrode comprising:
a body of metallic silver supporting a layer of silver chloride; and
a protective layer of methyl methacrylate coating said layer of silver chloride so as to inhibit corrosion of said layer of silver chloride but not its chloride ion sensitivity.

References Cited

UNITED STATES PATENTS

| | | | |
|---|---|---|---|
| 2,918,420 | 12/1959 | Sabins | 204—196 |
| 2,934,484 | 4/1960 | Anderson | 204—195F |
| 3,272,731 | 9/1966 | Hutchison et al. | 204—195F |
| 3,354,069 | 11/1967 | Jerrold-Jones et al. | 204—195F |

TA-HSUNG TUNG, Primary Examiner

U.S. Cl. X.R.

117—75, 113, 132C, 161UB, 161UC; 204—1T